United States Patent [19]
Ciciora et al.

[11] 3,867,575
[45] Feb. 18, 1975

[54] DIGITAL ANTI-JITTER CIRCUIT FOR VERTICAL SCANNING SYSTEM

[75] Inventors: Walter S. Ciciora, Park Ridge; Richard G. Merrell, Darien, both of Ill.

[73] Assignee: Zenith Radio Corporation, Chicago, Ill.

[22] Filed: June 22, 1973

[21] Appl. No.: 372,558

[52] U.S. Cl. .......... 178/69.5 TV
[51] Int. Cl. .......... H04n 5/04
[58] Field of Search.... 178/6.6 TL, 69.5 F, 69.5 TV

[56] References Cited

UNITED STATES PATENTS 3,517,127 6/1970 Grace .......... 178/69.5

*Primary Examiner*—Robert L. Griffin
*Assistant Examiner*—George G. Stellar
*Attorney, Agent, or Firm*—John J. Pederson; Nicholas A. Camasto; Joseph T. Downy

[57] ABSTRACT

A digital anti-jitter circuit, associated with a digital vertical scanning system in a television receiver, for use in preventing jitter problems by detecting potential jitter conditions as defined by the change in the level of the signal obtained by integrating composite sync occurring nearly coincidentally with an internal clock signal. The clock signal is utilized to generate a reset signal by comparing the received integrated composite sync signal to the clock signal at a time when the integrated composite sync signal crosses a given threshold level. A vertical drive signal is generated on the leading edge of the clock pulse following the crossing of the threshold level by the integrated composite sync signal. The digital anti-jitter circuit detects the condition when the integrated composite sync signal is occurring nearly coincidentally with the clock edge and reverses the phase of the clock signal.

6 Claims, 6 Drawing Figures

PATENTED FEB 18 1975

3,867,575

SHEET 1 OF 3

DIGITAL ANTI-JITTER CIRCUIT FOR VERTICAL SCANNING SYSTEM

BACKGROUND OF THE INVENTION

The present invention relates to the field of digital vertical scanning systems in television receivers, and more particularly to a digital anti-jitter circuit to detect potential jitter problems and reverse the phase of a comparison signal in the digital vertical system to avoid the potential jitter problem.

Vertical jitter is rapid movement of the television picture in a vertical direction occurring because of rapid time displacements of the vertical synchronizing pulses. A typical source of such displacements is impulse noise. Another source may result if the vertical sync pulse is synchronized to an oscillator as well as to an integrated composite sync. This latter condition typically exists in circuits which use countdown techniques for generating vertical sync signals.

In a digital vertical scanning system for a television receiver associated with a system that transmits horizontal and vertical synchronization information, various problems arise due to transmitted television signals having characteristics departing from National Television System Committee (NTSC) standards.

The NTSC standard synchronizing signal has a frequency ratio of horizontal to vertical sync pulses of 525 to 2 and a definite phase lock relationship between the vertical and horizontal sinc pulses. Signals identified as being "asynchronous," in relation to the digital vertical system with which the present invention is employed, include synchronization signals in which the frequency of the vertical sync is unrelated to the frequency of the horizontal sync, and those in which the vertical sync is locked to the frequency of the horizontal sync in a manner that does not correspond to NTSC standards. Television signals that are sometimes found in CATV (Cable Television) systems, where the ratio of horizontal to vertical sync pulses may or may not be locked, but in any case is not 525 to 2, would thus be classified as asynchronous.

The digital vertical system associated with the invention is designed to operate on either synchronous or asynchronous signals. The system includes some means of switching between synchronous and asynchronous operation. This may include an operator-actuated switch or may be, instead, an automatic system which distinguishes between NTSC and other signals. In a case where both synchronous and asynchronous signals are being received, if an operator-actuated switch is left in the synchronous position, noticeable erratic operation results when an asynchronous signal is received, due to improper vertical drive pulses. Therefore, when both synchronous and asynchronous signals are possible in that type of system, the operator leaves the switch in the asynchronous position.

With the system in the asynchronous mode and a received synchronous signal, a problem arises due to the procedure followed in generating the vertical drive pulses. In the asynchronous mode, a reset pulse is generated in every field, with a standard of two fields per frame for interlaced scanning. This reset pulse generates the vertical drive pulse. The timing for the reset pulse is established by comparing the integrated composite sync signal with a threshold level. The time when the integrated composite sync crosses the threshold level is compared to an internal clock pulse. A reset pulse is generated on the leading edge of the first clock pulse following the crossing of the threshold level by the integrated composite sync.

A jitter problem arises if the leading edge of the clock pulse occurs at nearly the same time that the integrated composite sync signal crosses the threshold. Any change in the threshold level or in the amplitude or timing of the integrated composite sync could cause the leading edge of the clock pulse to occur prior to the threshold crossing of the integrated composite sync. In that case, the reset pulse will be triggered by the leading edge of the next succesive clock pulse. The reset pulse for one field might occur one clock pulse in time earlier or later relatively from the next successive field reset pulse, thus causing the vertical drive pulse to have the same time discrepancy.

If the clock pulse rate is $n$ times the horizontal oscillator rate, the new reset pulse, if triggered by the next successive clock edge, causes the next field of the picture to be moved vertically one over $n$ ($1/n$th) line, with resultant jitter effects.

SUMMARY OF THE INVENTION

It is a primary object of the invention, therefore, to detect potential jitter conditions as defined by the leading edge of the clock pulse occurring nearly coincidentally with the threshold crossing of the integrated composite sync signal.

Another object is to provide a digital anti-jitter circuit that reverses the phase of the clock signal when potential jitter conditions are detected so as to displace the leading edge of the clock pulse that occurs nearly coincidentally with the threshold crossing of the integrated composite sync.

Another object is to provide a digital anti-jitter circuit that maintains the vertical drive pulse at the same relative time in successive fields regardless of slight variations in the integrated composite sync signals or in the threshold level, or noise on the integrated composite sync.

Accordingly, the invention relates to a digital anti-jitter circuit associated with a digital vertical system of a television receiver operating in a system that transmits horizontal and vertical synchronization information, where the phase relationship of the vertical and horizontal sync information may or may not be phase locked. The digital vertical scanning system includes vertical sync means for developing a vertical sync signal and a clock signal of a given frequency to develop a reset signal. The television receiver also includes timing means for developing a timing signal at the clock signal frequency. The digital anti-jitter circuit comprises jitter detection means having an integrated composite sync input coupled to the vertical sync means and having a clock input for comparing the time relationship between a clock signal and the integrated composite sync signal to develop a control signal that indicates the occurrence of a potential vertical jitter condition, and phase determination means having a control input that is coupled to the jitter detection means and a timing input coupled to the timing means. The phase determination means develops a clock signal and supplies the clock signal to the vertical scanning system and to the clock input of the jitter detection means. Also included in the phase determination means are means for reversing the phase of the clock signal whenever the control signal indicates the occurrence of a potential jitter condition.

BRIEF DESCRIPTION OF THE DRAWINGS

The features of the invention which are believed to be novel are set forth with particularity in the appended claims. The invention, together with further objects and advantages thereof, may best be understood, however, by reference to the following description taken in conjunction with the accompanying drawing, in the several figures of which like reference numerals identify like elements, and in which:

DESCRIPTION OF THE PREFERRED EMBODIMENT

Figure 1:
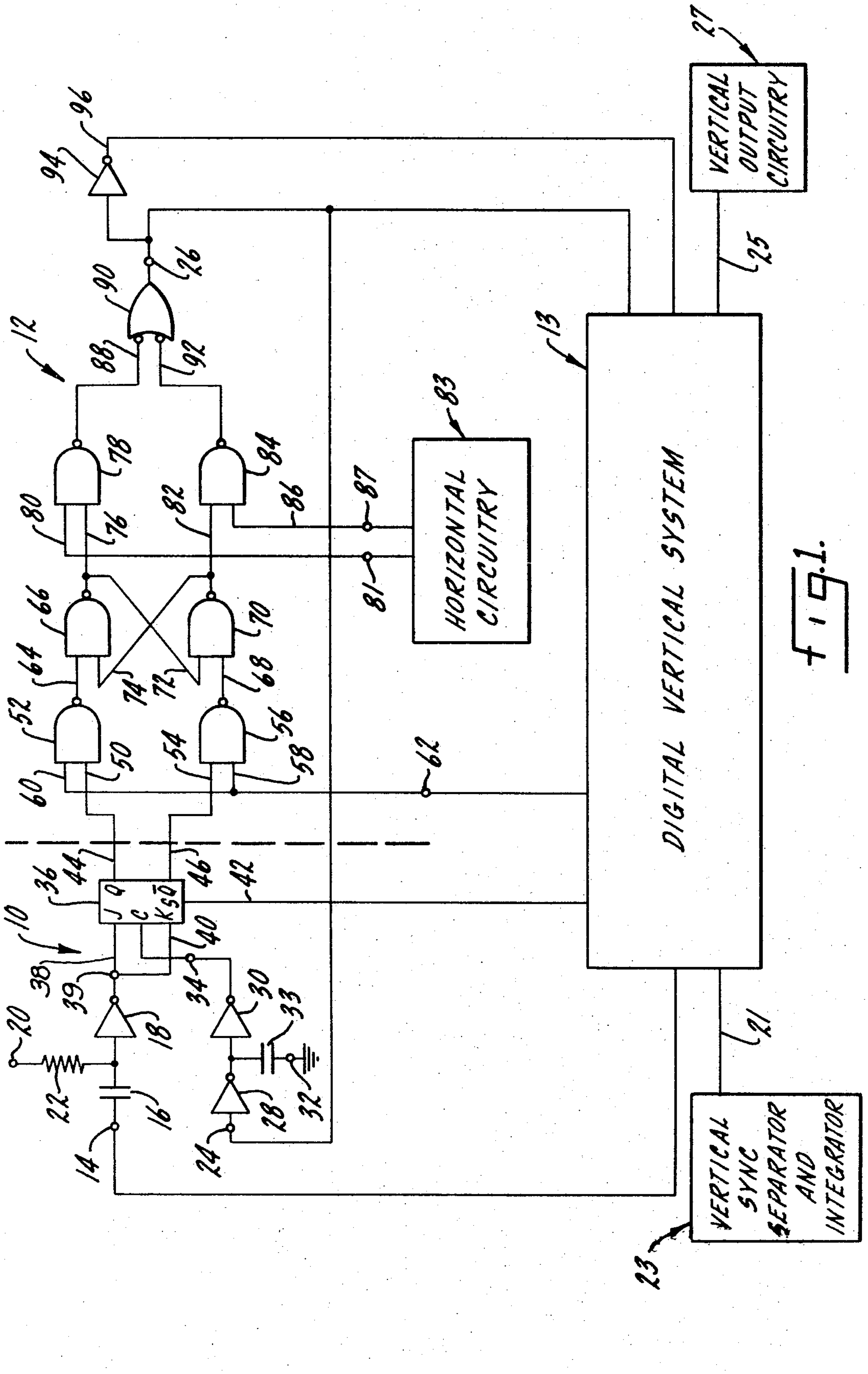
FIG. 1 is an electrical circuit diagram of one embodiment of the invention.

The digital anti-jitter circuit of FIG. 1 includes jitter detection means 10 and phase determination means 12. A pulse derived from the integrated composite sync is connected to an input terminal 14 of the jitter detection means 10 at one end of a capacitor 16. The other end of the capacitor 16 is connected to the input of an inverter gate 18 and is connected to a DC supply line 20 through a resistor 22. A second input 24 to the jitter detector 10 is a clock signal that is compared to the integrated composite sync signal to determine if potential jitter exists. The digital scanning system 13 has an integrated composite sync signal input 21 from a vertical sync separator and integrator 23. The vertical drive pulse output 25 of the digital scanning system 13 is connected to vertical output circuitry 27.

Input 24 of jitter detector 10 is connected to the output terminal 26 of the phase determination means 12. Input terminal 24 is the input of an inverter gate 28 whose output is connected to the input of another inverter gate 30 whose output is connected, at terminal 34, to the clock input C of a conventional J-K flip-flop 36. The output of inverter gate 18 is connected to the J data input 38 and to the K data input 40 of the flip-flop 36 through a terminal 39. A mode-indicating signal from the digital vertical system 13 is connected to the set input 42 of the flip-flop 36. The mode indicating level is a high or 1 level in the synchronous mode and a low or 0 level in the asynchronous mode. The Q output 44 and the $\overline{Q}$ output 46 of flip-flop 36 form the outputs of jitter detector 10.

The outputs 44 and 46 of flip-flop 36 are inputs to the phase determination means 12. The Q output 44 is connected to a first input 50 of a NAND gate 52. The $\overline{Q}$ output 46 is connected to one input 54 of a NAND gate 56. The second input 58 of NAND gate 56 and the second input 60 of NAND gate 52 are both connected to a terminal 62 of the digital scanning system 13. The output of NAND gate 52 is connected to one input 64 of a NAND gate 66. The output of NAND gate 56 is connected to one input 68 of another NAND gate 70. The two NAND gates 66 and 70 are interconnected in a latch arrangement, with the output of NAND gate 66 connected to the second input 72 of NAND gate 70 and the output of NAND gate 70 connected to the second input 74 of NAND gate 66.

The output of NAND gate 66 is also connected to a first input 76 of a NAND gate 78. The second input 80 of NAND gate 78 is connected to a terminal 81 to which a scanning frequency signal of some integral multiple of the horizontal frequency is supplied from the horizontal circuitry 83 of the television receiver. The output of NAND gate 70 of the latch arrangement is connected to a first input 82 of a NAND gate 84. The second input 86 of NAND gate 84 is connected to a terminal 87, which receives the same signal from circuit 83 as is applied to terminal 81, but with an opposite polarity. The output of NAND gate 78 is connected to one input 88 of a negative-logic NOR gate 84. This negative-logic NOR gate 84 is the same type of device as is used for positive logic NAND gate as exemplified by 78. The output of the negative-logic NOR gate 90 is the clock output 26 of the phase determination means 12 as well as the output of the overall digital anti-jitter circuit. The output 26 of NOR gate 90 is also connected to the input of an inverter 94, whose output 96 forms the inverse clock signal relative to that of output 26. The output 26 and 96 are connected to the vertical system 13 to provide a comparison clock signal for the system.

Inverter gates 18, 28, 30 and 94, as well as NAND gates 52, 56, 66, 70, 78, 84, all have supply connections to the DC supply line 20 and the ground bus 32 which are not shown. Similarly, flip-flop 36 and NOR gate 90 also include DC supply lines.

Figure 2:
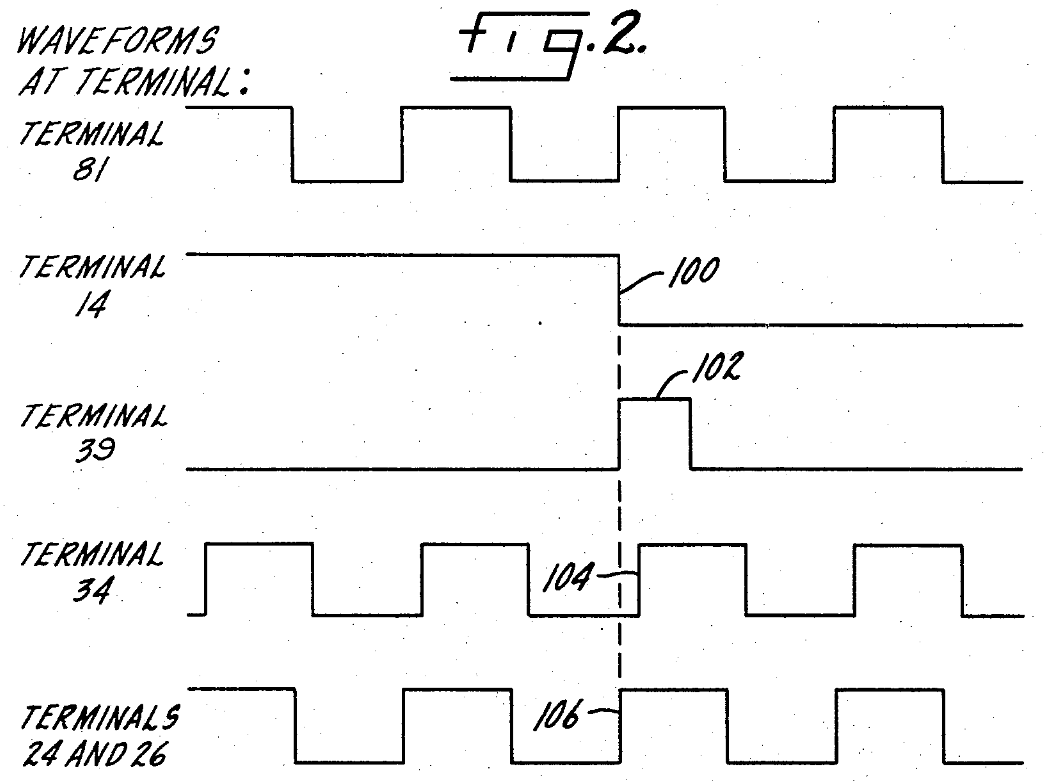
FIG. 2 is a diagrammatic representation of various waveforms occurring in the circuit of FIG. 1.

In operation, the derived vertical sync information input waveform at terminal 14 (FIGS. 1 and 2) exhibits a change of state 100 (FIG. 2) from a high or "one" level to a low or "zero" level at the time the television receiver receives a change in level of integrated composite sync. The signal at terminal 14 is differentiated by capacitor 16 and resistor 22 (FIG. 1) to form a pulse 102 (FIG. 2) at a J input terminal 38 of flip-flop 36. The pulse 102 produced from the vertical sync information input at terminal 14 is also present at the K data input 40 of flip-flop 36. The clock input to terminal 24 is the signal that is compared to the derived vertical sync pulse at terminal 14 to determine if potential jitter exists. The waveform at terminals 24 and 26, shown in FIG. 2, is inverted through gate 28 and delayed by capacitor 33 and again inverted by gate 30 (FIG. 1). The resultant clock signal at the clock input terminal 34 of flip-flop 36 has delayed edges such as at 104 relative to the original clock signal at 26 such as at edge 106 (FIG. 2). The edge 104 of the signal at terminal 34 is delayed so that if the vertical sync edge 100 and the clock edge 106 of the signal at terminal 24 are coincident, proper setup time for the J-K inputs of flip-flop 36 will be provided. The pulse width of pulse 102 at terminal 38 must be at least equal to the setup time of the flip-flop and must be less than a half cycle of the clock signal to avoid false indications of jitter problems.

Potential jitter conditions occur whenever the edge 100 of the vertical sync information signal at terminal 14 occurs nearly coincident with the leading edge 106 of the clock signal at terminal 26. If potential jitter conditions are present, the leading edge of the clock pulse at terminal 34 will sometimes occur during the pulse 102. If no potential jitter conditions are present the leading edge of the clock signal at clock input 34 of flip-flop 36 will not occur during the pulse 102 at the data inputs 38 and 40. Assuming that the asynchronous mode is selected, with a mode-indicating level at input 42 at a 0 level, the outputs 44 and 46 of the flip-flop 36 may be in any random state.

As flip-flop 36 is clocked by a waveform at terminal 34, when no potential jitter conditions are present, with 0 level data input at terminals 38 and 40, the flip-flop produces no change in the output signals at terminals 44 and 46 from their random states. When no pulse 102 is present, or if the pulse 102 does not occur during the leading edge 104 of the clock signal on terminal 34, there will be no change of the Q and $\overline{Q}$ outputs of the flip-flop 36. Assume that the random state of output 44 is a 1 level and the output 46 a 0 level. The output of NAND gate 56 will then be high, due to the low level at one of its inputs 54. The normal latch condition is then a high or 1 level at the output of gate 66 and a low or 0 level at the output of gate 70.

In this latch condition, the output of NAND gate 78 will be the opposite polarity with respect to the oscillator signal appearing at terminal 81. Since the input 82 of NAND gate 84 is at its low level, the output 92 is a steady high or 1 level independent of the inverse oscillator signal at input 87. The negative-logic NOR gate 90 then inverts the input at 88 and produces the clock signal at output 26, which is of the same phase and frequency as the oscillator signal at terminal 81. The inverter gate 94 inverts the output clock signal from terminal 26 to provide an inverse clock signal at output 96 for various digital circuits in the vertical system 13.

When potential jitter conditions are present, with the leading clock edge such as 104 of the waveform at terminal 34 occurring during the vertical sync pulse 102, flip-flop 36, having high J and K data inputs when it receives a clock signal, inverts the Q and $\overline{Q}$ outputs by producing a low or 0 level at output 44 and a high or 1 level at output 46. The inversion of the Q and $\overline{Q}$ outputs of flip-flop 36 provides a digital indication of the presence of potential jitter conditions. When the enable signal from the vertical master clocking arrangement of the vertical system 13, at terminal 62, is a high or 1 level, the two high inputs at terminals 54 and 58 of NAND gate 56 produce a low level at the input of NAND gate 70.

The enable signal from terminal 62 controls the timing for the phase reversal of the clock signal developed at output 26 during potential jitter conditions, so that the phase reversal does not occur at an inappropriate time for the vertical scanning system 13. A phase reversal occurring at an improper point in time, such as during a reset pulse of the vertical scanning system could cause a shortened reset and disturb the timing of the system.

When the enable signal at terminal 62 goes high, and with a high level at the $\overline{Q}$ output 46 of flip-flop 36, NAND gate 56 produces a low output to the input 68 of NAND gate 70. This produces a high at the output of NAND gate 70. With a high level at input 64 of latch gate 66 and a high at input 74 from the output of NAND gate 70, the latch produces a low output from NAND gate 66. The inverse oscillator signal at 87 then is gated through NAND gate 84 and negative-logic NOR gate 90. The inverted-phase oscillator signal at terminal 87 then appears at the clock output 26. The oscillator signal at terminal 81 is now blocked through gate 78, due to the low level at input 76 of gate 78, producing a steady high level at the output of gate 78.

Figure 3:
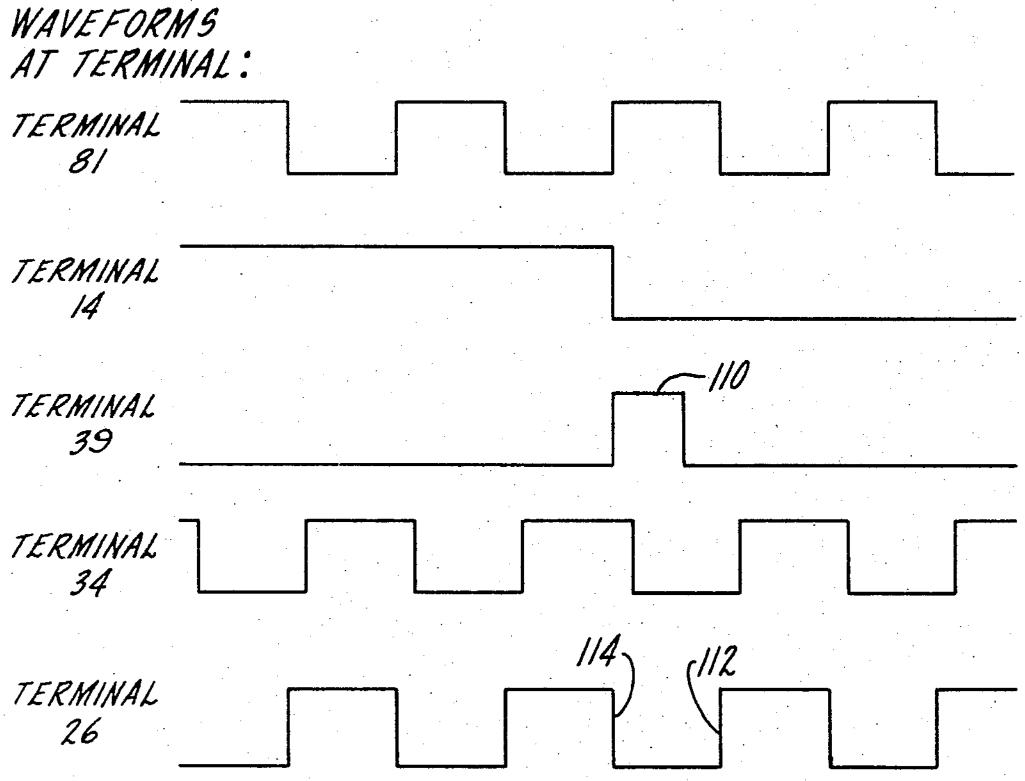
FIG. 3 is a diagram, similar to FIG. 2, of waveforms occurring after a potential jitter condition has been detected.

The digital anti-jitter circuit will continue supplying the inverted oscillator signal from input 86 to the clock output 26 until potential jitter conditions are again detected by the flip-flop 36. The anti-jitter circuit has now reversed the phase of the clock signal 26 so that the vertical sync pulse 110 of the waveform at terminal 38 (FIG. 3) is no longer coincident with the leading edge 112 of the clock signal at terminal 26. The pulse 110 now occurs during the trailing or inactive edge 114 of the clock signal at terminal 26. No further phase reversal of the clock signal at terminal 26 will occur unless the vertical sync pulse 110 begins to coincide with the leading edge 112 of the clock signal. Flip-flop 36 detects and stores the potential jitter indication so as to change the state of the latch formed by gates 66 and 70 when the enable signal at terminal 62 determines the appropriate timing. The latch formed by gates 66 and 70 then maintains the appropriate oscillator signals at the output 26 until a new set of potential jitter conditions are detected along with the timing of the enable signal to terminal 62. It should be understood that a similar result is obtained if the assumed random state of the outputs of the flip-flop 36 are reversed with a 1 level at $\overline{Q}$ output 46 and a 0 output at Q output 44.

Figure 4:
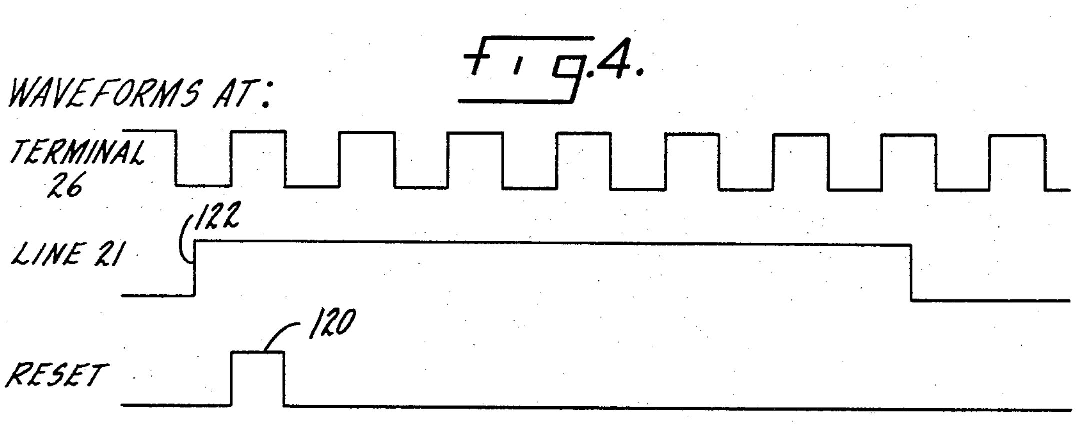
FIG. 4 is a diagrammatic representation of waveforms occurring in the reset function of the circuit of FIG. 1.
Figure 5:
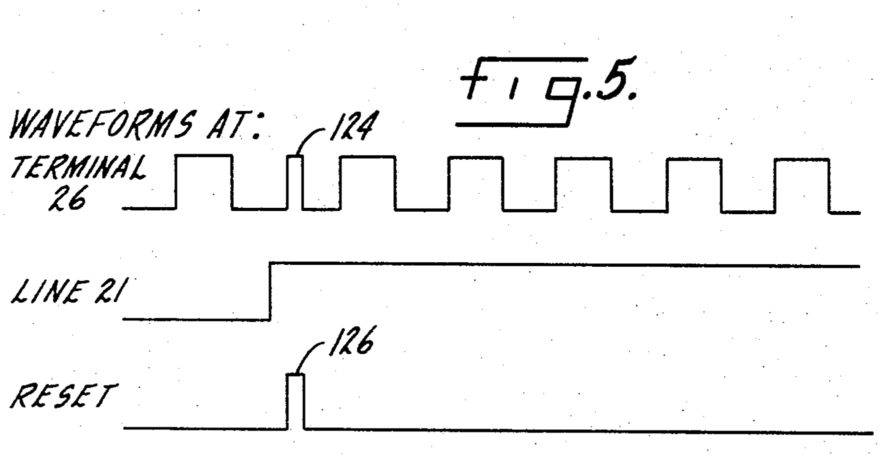
FIG. 5 is a diagram, similar to FIG. 4, of waveforms depicting a potential reset problem.
Figure 6:
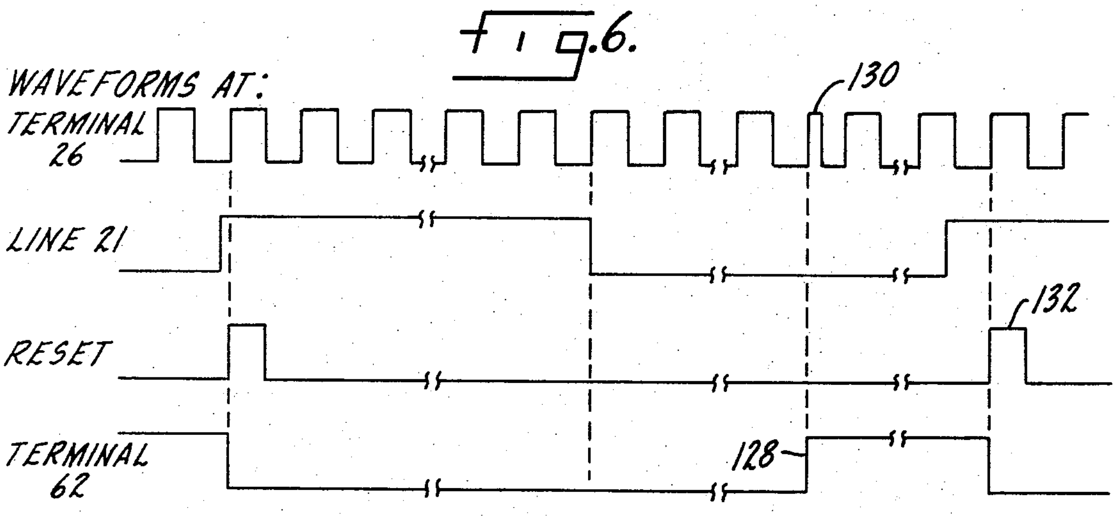
FIG. 6 is a diagram, similar to FIG. 4, of waaveforms illustrating the solution to the reset problem of FIG. 5.

The detection of potential jitter conditions and phase reversal of the clock signal is shown relative to the reset pulse of the digital vertical system 13 in FIGS. 4, 5 and 6. Under normal conditions, no detection of potential jitter, the reset pulse 120 of the digital vertical system 13 is developed during the first positive pulse of the clock signal at terminal 26 following the leading edge 122 of the integrated vertical signal 21.

If the phase of the clock signal 26 is inverted immediately when potential jitter conditions are detected, as at 124 of FIG. 5, the reset pulse 126 would be shortened. As discussed previously, this shortened reset pulse could disturb the timing of the system.

Therefore, when potential jitter conditions are detected, the phase of the clock signal is not inverted immediately. The clock signal waveform at terminal 26 of FIG. 6 is not inverted until the enable signal at terminal 62 is high at 128. The inversion of the clock signal at 130 of FIG. 6 then takes place so as to make the correction for the following field with a normal reset pulse 132 being maintained. The potential jitter conditions are then detected in one field and the clock signal is inverted in the next successive field when the enable signal at terminal 62 becomes high indicating the proper time for an inversion.

In a particular system, the anti-jitter circuit may never detect potential jitter conditions with the vertical sync pulse 102 never occurring nearly coincidental with the leading clock edge 104. In this case, the clock output at terminal 26 would never exhibit phase reversal. In other systems, it is possible that the anti-jitter circuit will reverse the phase at numerous intervals as the vertical sync pulse shifts from the leading to trailing edges of the clock signal at terminal 26 during vertical sync periods.

The digital anti-jitter circuit detects potential jitter conditions and reverses the phase of the clock comparison signal so as to eliminate the problems that may arise with the vertical sync signal of the vertical system and the clock pulse occurring so nearly in coincidence that minor noise pulses, spikes or changes in threshold levels would cause the reset pulse to occur prematurely between successive field reset pulses.

The jitter problem in the asynchronous mode is most critical when a synchronous signal is being received. It should be noted that when the vertical system is in the synchronous mode and a synchronous signal is being received, there is no jitter problem because the reset pulses are timed by the internal clock arrangement for several consecutive fields, so that the one-clock-period shift of the reset will occur very rarely. In this case, the mode signal on line 42 is high, which holds flip-flop 36 in the state with Q output 44 low. This effectively disables the anti-jitter circuit. Also, with purely random or asynchronous signals being received, the problem is not apparent, due to random distribution of the vertical sync pulses with respect to the clock pulse edges, so that the probabilities of the two edges being nearly coincident from field to field is very small. However, when a synchronous signal is being received and the vertical system is in the asynchronous mode, the problem is magnified greatly because the probabilites of the two edges occurring coincidentally are quite high, due to the accurate timing of the two waveforms. Therefore, whenever the potential jitter conditions are detected, a reversal of the phase of the clock signal at terminal 26, shifting the vertical sync pulse to the inactive edge of the clock signal, eliminates the potential problem.

Whereas, the preferred form of the invention has been shown and described herein, it should be realized that there may be many modifications, substitutions and alterations thereto without departing from the teachings of this invention.

What is claimed is:

1. A digital anti-jitter circuit for a television receiver intended to utilize a telecast including horizontal and vertical synchronization information which may or may not be phase locked, said television receiver including a digital vertical scanning system comprising vertical sync means to develop a vertical sync signal and timing means for developing a timing signal related to horizontal timing, said anti-jitter circuit comprising:

phase determination means, coupled to said timing means, producing a clock signal for controlling said digital vertical scanning system;

jitter detection means, having a vertical sync input coupled to said vertical sync means having a clock input coupled to said phase determination means, for comparing the time relationship between said clock signal and said vertical sync signal to develop a control signal indicative of the occurrence of a potential vertical jitter condition;

said phase determination means having a control input coupled to said jitter detection means for receiving said control signal and including means for reversing the phase of said clock signal whenever said control signal indicates the occurrence of a potential jitter condition.

2. The circuit of claim 1 further characterized in that said jitter detection means includes logic memory means operably connected for developing and maintaining said control signal at a digital indication of potential jitter conditions until potential jitter conditions between said inputs of said jitter detection means are again present.

3. The circuit of claim 2 further characterized in that said contol signal exhibits a change in logic state when potential jitter conditions between said inputs of said jitter detection means are present.

4. The circuit of claim 3 further characterized in that said phase determination means reverse the phase of said clock signal when the active edge of said clock signal is nearly coincident with the edge of said vertical sync signal.

5. The circuit of claim 4 further characterized in that said phase determination means includes logic enable means connected to said vertical scanning system for inhibiting said phase reversal at certain intervals.

6. The circuit of claim 5 further characterized in that said timing means provides a first timing signal and a second timing signal of opposite phase, and wherein said logic gating means of said phase determination means selects between said first and second timing signals to establish the phase of said clock signal when both said control signal exhibits a digital indication of potential jitter conditions, and said logic enable means is enabled by said digital vertical scanning system.

* * * * *